United States Patent

Cooke et al.

Patent Number: 5,271,488
Date of Patent: Dec. 21, 1993

[54] FRICTION FACINGS AND CARRIER ASSEMBLY

[75] Inventors: Richard D. M. Cooke, Warwick; Stuart J. Sleath, Whitnash, both of England

[73] Assignee: Automotive Products, plc, Warwickshire, England

[21] Appl. No.: 910,110

[22] PCT Filed: Dec. 12, 1990

[86] PCT No.: PCT/GB90/01942
§ 371 Date: Jul. 8, 1992
§ 102(e) Date: Jul. 8, 1992

[87] PCT Pub. No.: WO91/10842
PCT Pub. Date: Jul. 25, 1991

[30] Foreign Application Priority Data

Jan. 10, 1990 [GB] United Kingdom ............ 9000521

[51] Int. Cl.⁵ .................. F16D 69/04; F16D 13/64
[52] U.S. Cl. .................... 192/107 C; 192/107 R; 188/218 XL
[58] Field of Search .............. 192/107 R, 107 C; 188/218 XL

[56] References Cited

U.S. PATENT DOCUMENTS

| | | | |
|---|---|---|---|
| 4,821,860 | 4/1989 | Crawford et al. | 192/107 C |
| 5,076,410 | 12/1991 | Maycock et al. | 192/107 R |
| 5,137,133 | 8/1992 | Graton et al. | 192/107 C |

FOREIGN PATENT DOCUMENTS

| | | |
|---|---|---|
| 2191830 | 12/1987 | United Kingdom . |
| WO89/05411 | 6/1989 | World Int. Prop. O. . |
| WO90/03525 | 4/1990 | World Int. Prop. O. . |

Primary Examiner—Richard M. Lorence
Attorney, Agent, or Firm—Paul E. Milliken; Lee A. Germain

[57] ABSTRACT

A friction material facing (20) and carrier (11) assembly in which the facing (20) is secured to the carrier (11) by a plurality of concentric circular stripes (24A, 24B, 24C) of adhesive (24). Each stripe (24A, 24B, 24C) is interrupted at a single point on the circle to form a gap (25A, 25B, 25C) between the beginning and end of each circle of adhesive. The end of one circle may be joined to the beginning of the adjacent circle so as to form a continuous stripe of adhesive (24) from the inner margin to the outer margin of the facing (20).

8 Claims, 4 Drawing Sheets

PRIOR ART

FRICTION FACINGS AND CARRIER ASSEMBLY

This invention relates to friction material facing and carrier assemblies particularly for friction clutch driven plates, and to a method of manufacture thereof.

It is known to manufacture a friction clutch driven plate by the use of adhesive to secure an annular friction facing to a support or carrier plate. In conventional driven plates an epoxy resin based adhesive may be used for this purpose.

It is desirable for the friction facing of a driven plate to have a certain degree of flexibility and axial cushioning. The epoxy resin adhesive film generally provides little or no compliance or cushioning.

The axial cushioning is desired to ameliorate a phenomenon known in the trade as "heat spotting", which leads to localised overheating of high spots on the friction faces of the driven plate ,flywheel, or pressure plate. The cushioning also helps to prevent clutch judder on take-up of the drive.

The necessary axial cushioning is generally provided between the opposed back faces of a pair of annular friction facings. This is conventionally achieved by mounting the facings on spring steel cushioning segments.

EP0252583A, describes the use of a silicone rubber adhesive for mounting a friction facing onto a carrier or support. The silicone rubber adhesive serves to secure the facing to its support and also provides the necessary axial cushioning, thus allowing a simplification of the driven plate construction. In PCT/GB88/00953 there is disclosed a construction in which the silicone rubber adhesive is formed in discrete concentrically spaced circles. Each circle of adhesive is described as being formed by a respective adhesive nozzle.

In a further development, disclosed in EP0323036, the silicone adhesive is applied to the reverse side of the friction facing is a continuous spiral of substantially three turns, the spiral starting radially inwardly of the facing and moving outwards.

This latter system has the advantage that only a single application nozzle is needed and that there are less problems associated with starting and finishing of the adhesive application process.

However, the spiral locus of the adhesive on the friction facing leads to an out of balance construction. As can be seen in FIG. 1, the elastomeric adhesive is laid onto the facing 2 in the form of a spiral 4 comprising three turns 4A, 4B, 4C. There are large areas X and Y of friction facing on both the radially inner and outer margins of the facing that are free of adhesive.

The present invention seeks to overcome the above problem whilst still ameliorating the problems already overcome in the known prior art.

According to the invention there is provided a friction material facing and carrier assembly for a clutch driven plate, and which comprises at least one annular friction facing secured to the carrier by a plurality of concentric circular stripes of adhesive elastomeric material which are coaxial with the facing, each circular stripe being interupted at only a single point on the circle to form a gap between the beginning and end of the respective circle, the interruptions in each circular stripe being radially aligned one with the other, and the end of one circular stripe is joined to the beginning of the adjacent concentric circular stripe so that the adhesive forms a continuous stripe from the radially inner margin of the facing to the radially, outer margin of the facing.

Also according to this invention there is further provided a method of making a friction material facing and carrier assembly having at least one annular friction facing secured to a carrier by adhesive applied to the back face of the facing, said method comprising the steps of extruding elastomeric adhesive material from a nozzle, causing simultaneous relative rotational movement between the nozzle and the facing so as to lay a substantially circular stripe of adhesive material onto the back face of the facing, and relatively displacing the nozzle radially just before the circle is completed, and repeating said operations as desired to form a desired number of concentric circles of elastomeric adhesive, in which the end of one circular stripe is joined to the beginning of the adjacent circular stripe to form a continuous stripe from the radially inner margin to the radially outer margin of the facing.

The invention will be described by way of example and with reference to the accompanying drawings in which:

FIG. 1 illustrates a prior art friction facing having adhesive thereon as is known from EP 0323036A1, FIG. 2 is an illustration of a friction material facings and carrier ,according to the invention, FIG. 3 s a section on the line III—III of FIG. 2, FIG. 4 is a view of the reverse side of the friction facing showing the adhesive laid in concentric circular stripes, FIG. 5 and 6 are similar views to FIG. 4 showing variations on the adhesive patter and FIG. 7 is a section on the line VII—VII of FIG. 2.

With reference to FIGS. 2 and 3, there is illustrated a friction material facing and carrier assembly 10 which is intended to form part of a friction clutch driven plate for a motor vehicle , preferably a motor car. The assembly 10 comprises a steel annular carrier plate 11 having a centre hole 12 for mounting of the plate 11 onto a driven plate hub (not shown). The carrier plate 11 is formed with windows 13 for receiving torsional damping springs (not shown) and holes 14 for stop rivets (also not shown) in a manner well known in the trade.

The carrier plate 11 has a plurality of radially outwardly extending fingers 15 equiangulary spaced around its outer priphery. Preferably there are thirty fingers 15 but other numbers could be used if desired. The fingers 15 are capable of flexing resiliently to allow axial movement of a friction facing 20 mounted thereon, the friction facing 20 being somewhat flexible to allow small amounts of axial deformation.

The carrier plate 11 preferably has two coaxial friction facings 20 mounted thereon one facing 20 on each axial side of the carrier plate 11 with the friction surfaces 17 oppositely directed.

The facings 20 are mounted on the fingers 15 by use of an adhesive material which is laid onto the back face 18 of each facing 20 to adhere the respective facing to the fingers 15.

At least one of the facings 20 is secured to the carrier plate 11 by use of an elastomeric adhesive material 24, preferably a silicone rubber such as RTV7057 sold by Dow Corning, or Elastosil E14 produced by Waker-Chemie Gmbh, or RTV159 produce by the General Electric Company (USA).

Alternatively a two pack cure silicone rubber can be used.

The silicone rubber can withstand temperatures of upto 250°-300° C. and is sufficiently flexible to provide cushioning between the friction facings 20.

For a better understanding of the relationship between the resilience of the silicone rubber, the clutch driven plate clamp loads, and the flexibility of the friction facings the reader is directed to the present applicants published European Patent application 0252583A1.

On said one facing 20, the elastomeric adhesive 24 is laid in coaxial concentric circular stripes or beads 24A, 24B, 24C which in FIG. 2 can be viewed in the spaces or gaps 16 between adjacent fingers 15 and which is best seen in FIGS. 4 to 6. The concentric circular stripes 24A, 24B, and 24C can be evenly radially spaced as shown, or these spacings can be varied as desired.

In the preferred embodiment of the invention shown in FIG. 2, both friction facings 20 are secured to the carrier 11 by silicone rubber adhesive laid in substantially identical patterns of three concentric circles.

The spaces 16 between the fingers 15 allow the facing 20 to flex and the beads or stripes of adhesive 24A, 24B, 24C on one facing 20A can be arranged to be in alignment with the stripes of adhesive 24A, 24B, 24C, on the other facing 20B, so that the adhesive bead on one facing unites with the adhesive bead on the other facing in said spaces 16, so that some resilient support is provided between the facings at the spaces 16. This particularly useful with the two pack silicone rubber. The pattern or form of the adhesive material 24 when laid onto the facing is best seen in FIG. 4. There are three coaxial concentric circular stripes 24A, 24B, 24C and each circular stripe is interupted at a single point in the circle to form a gap 25A, 25B, 25C between the beginning and end of the respective circle of adhesive. In FIG. 4 the laying of the adhesive onto the friction facing begins at the point 'S' on the radially inner margin and as the first circle of adhesive 24C is almost completed the adhesive stripe is displaced radially outwardly to the next adjacent circle 24B and so on until the desired number of turns or circles of adhesive have been laid onto the facing and the adhesive stripe 24 is at the outer margin of the facing. There is therefore a continuous bead of adhesive from the inner margin to the outer margin of the facing. A gap 25A is also left in the last turn 24A on the outer periphery of the facing 20 so that there is a continuous passageway 26 from the inner periphery to the outer periphery of the facing. This passageway 26 allows for the removal of gases emitted by single pack silicone rubbers during their curing processes.

The gaps 25A, 25B, and 25C are substantially radially aligned since the radial displacements of the adhesive stripe 24 occur at the same angular location for each circle.

The bead or stripe 24 of adhesive may be given a slightly sinusoidal form as shown to increase its contact area.

Alternatively the adhesive stripe 24 can begin at the outer margin of the facing and the nozzle be moved radially inwardly as required.

However the gaps could be circumferentially offset by an angle of 360/n where n is the number of gaps, so that in this case where n is 3 the gaps are circumferentially offset by about 120 degrees.

The elastomeric adhesive can be applied to the respective friction facing by extruding the elastomeric adhesive through a nozzle and by simultaneously causing relative circular movement between the nozzle and the facings to apply a circular stripe or bead of adhesive to the back surface 18 of the facing, and then just before the circle is complete, relatively displacing the nozzle radially and repeating the relative rotation and displacement operations until the desired number of circles of adhesive have been laid.

Figure 1:
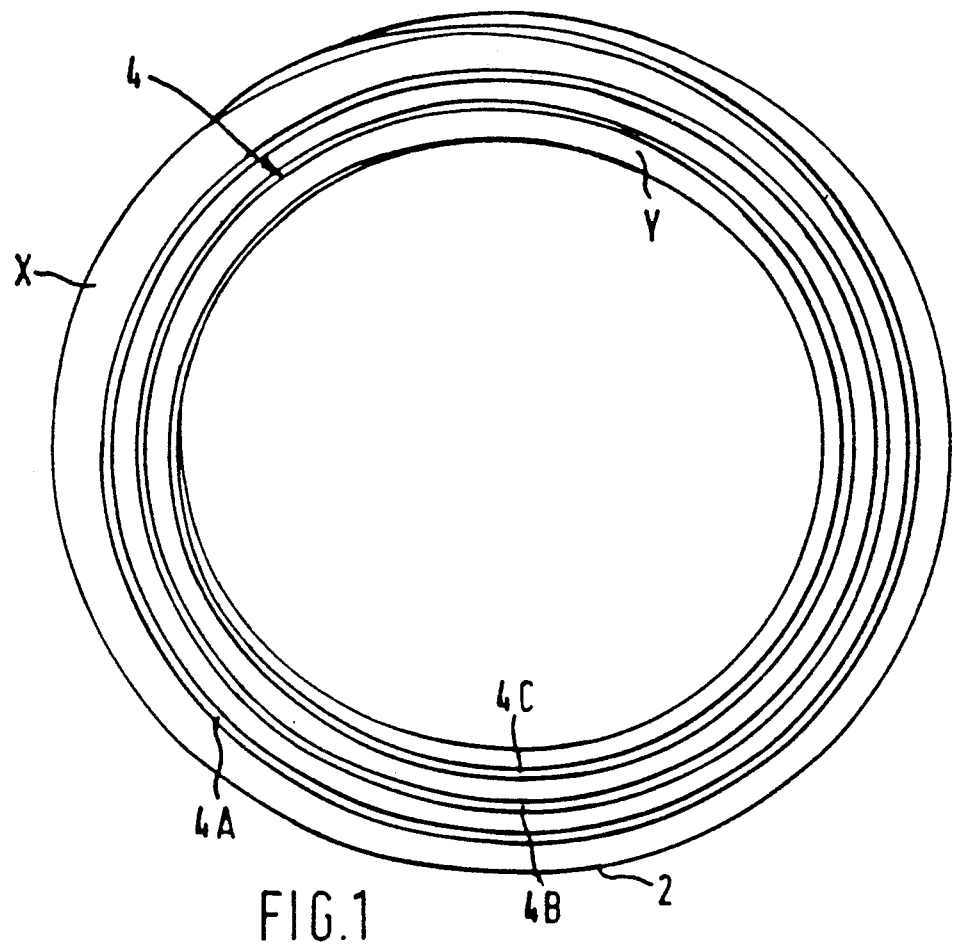
Figure 7:
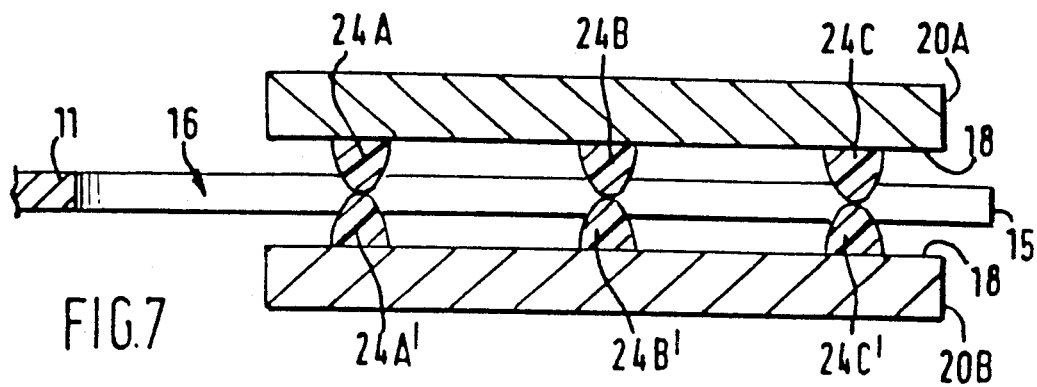
Figure 2:
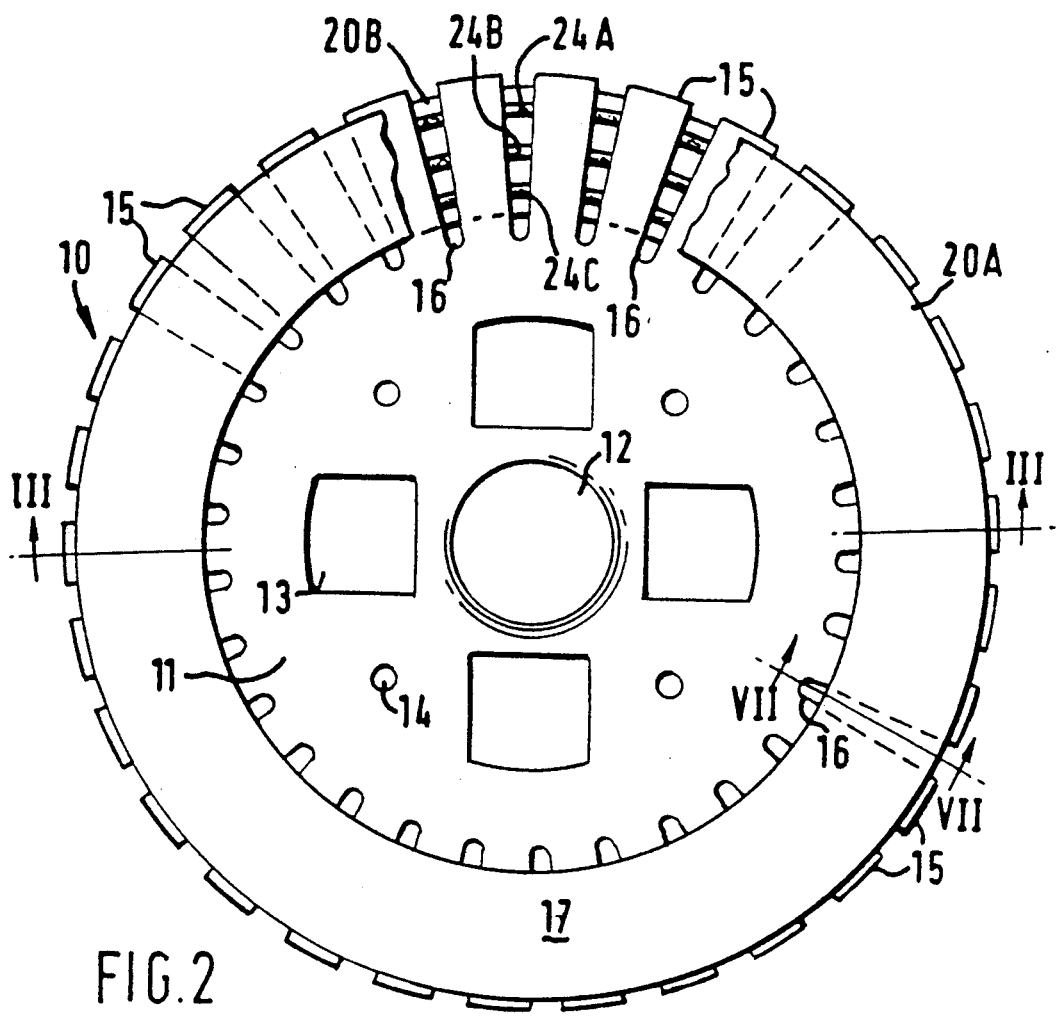
Figure 3:
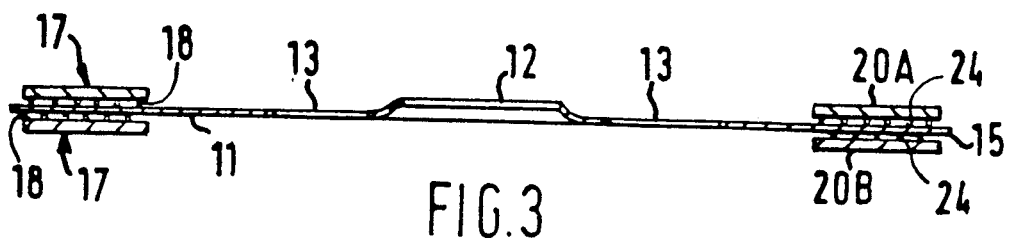
Figure 4:
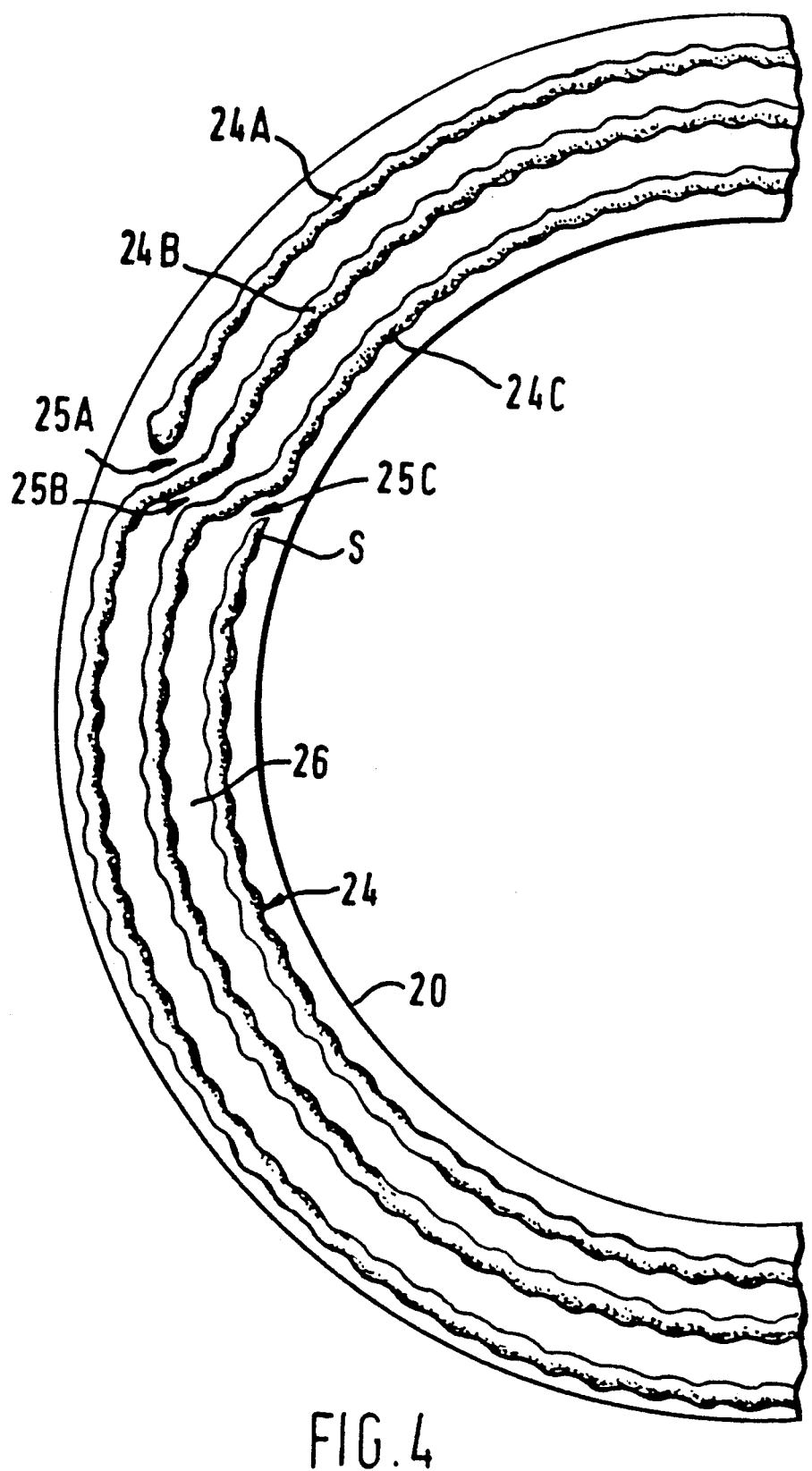
Figure 5:
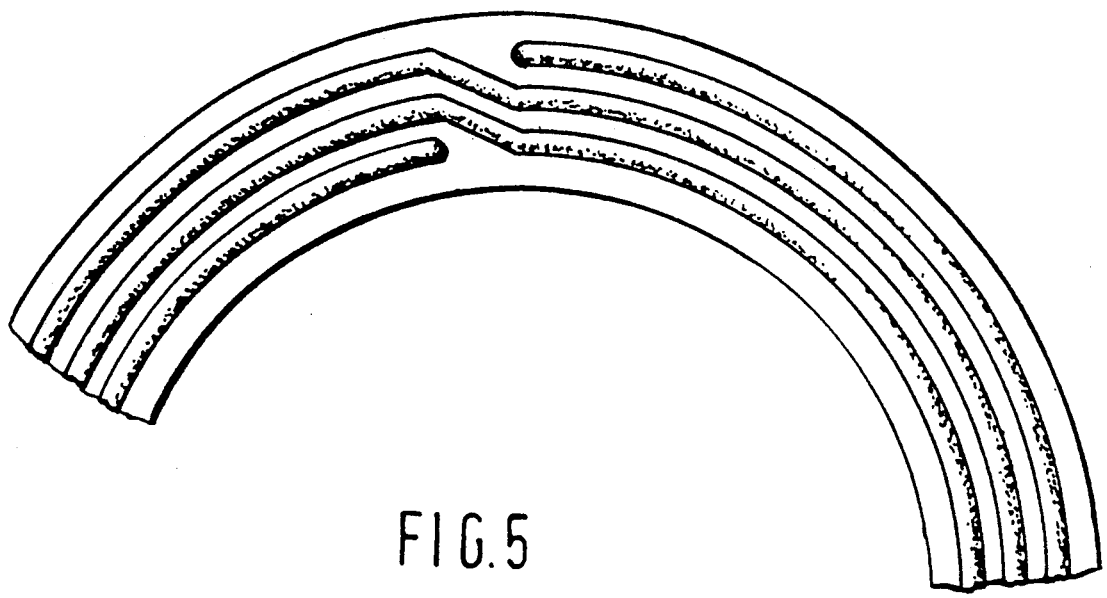
FIG. 5 shows a variation in adhesive patterns which is almost identical to that shown in FIG. 4 excepting that the adhesive stripe has no sinusoidal form imparted to it as it is laid.

The extrusion of adhesive is stopped on the last circle so as to leave the gap 25A in outer circuler stripe 24A This will produce an adhesive pattern similar to that shown in FIG. 4.

The stripe can be given a sinusoidal form by slight relative sideways movement of the nozzle during the relative rotation.

Figure 6:
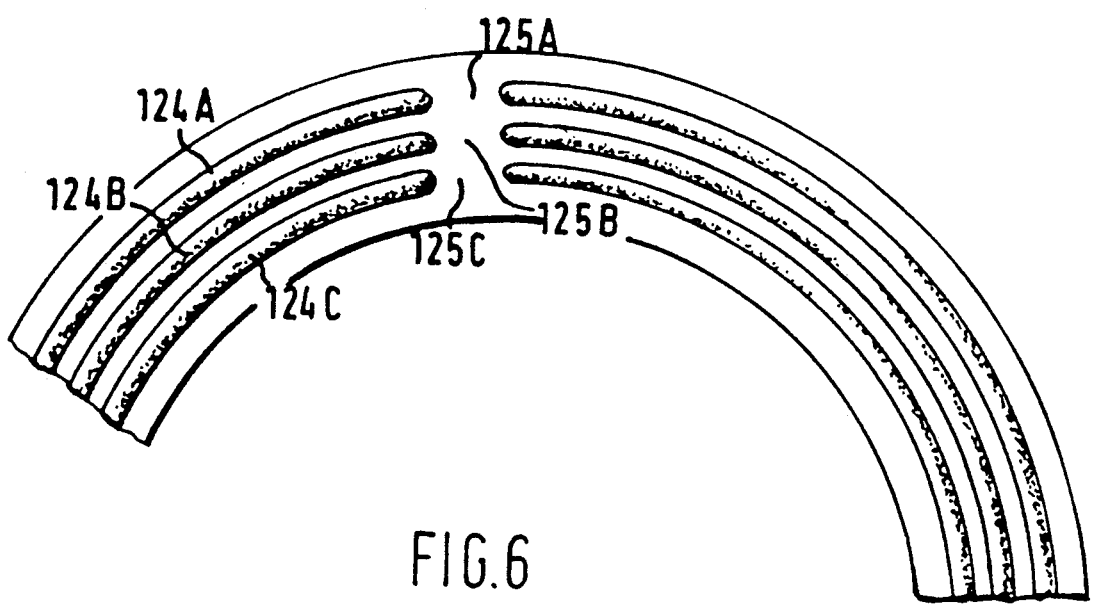
FIG. 6 shows a variation of the embodiment of FIG. 5 in which each circle 124A, 124B, 124C of adhesive stripe has a respective gap 125A, 125B, 125C therein, and the gaps are shown in radial alignment. The adjacent concentric circles of adhesive are isolated from each other unlike in FIG. 4 where they are joined.

To obtain the adhesive pattern shown in FIG. 6, the extrusion flow of the adhesive material is cut off during the relative radial displacement of nozzle, and to offset the gaps the extrusion is not re-commenced until after a degree of relative rotation of the nozzle and facing which is equal to the desired circumferential offset.

Preferably the facing is held stationary and the nozzle is moved relative to the facing to lay the adhesive material stripe onto the facing. The nozzle is moved at a substantially constant linear speed to lay a stripe of substantially constant cross-section. However, the cross-sectional area of the extrudate adhesive can be alterered as desired by varying the extrusion speed of the adhesive or the linear speed of the nozzle.

The adhesive laying process is started at the radially inner margin of the facing 20 and is moved radially outwardly by the relative radial displacements of the nozzle, or may be started at the outer margin and moved inwardly as previously discussed.

Once the desired pattern of elastomeric adhesive materials has been laid on the back face 18 of the facing 20, the facing can be mounted onto the fingers 15 of the carrier plate 11. The facing 20 must be held flat as the carrier plate 11 is pressed into contact with the adhesive, and spacer means must be provided between the carrier plate and facing to prevent the adhesive from being squeezed out of shape.

A suitable method and apparatus is described in British Patent application 88174933.

An appropriate passage of time must be allowed for full cure of the adhesive. For example, a single pack silicone rubber RTV7057 will take about 48 hours to cure at room temperature with a humidity of 50%.

We claim:

1. A friction material facing and carrier assembly for a clutch driven plate, and which comprises at least one annular friction facing secured to the carrier by a plurality of concentric circular stripes of adhesive elastomeric material which are coaxial with the facing, each circular stripe being interrupted at only a single point on the circle to form a gap between the beginning and end of the respective circle, the interuptions in each circular stripe being radially aligned one with the other, wherein the end of one circular stripe is joined to the beginning of the adjacent concentric circular stripe so that the adhesive forms a continuous stripe from the radially inner margin of the facing to the radially outer margin of the facing.

2. An assembly as claimed in any one of claims 1, wherein the stripe has a sinusoidal form.

3. An assembly as claimed in claim 1, wherein the adhesive is a silicone rubber adhesive.

4. An assembly as claimed in claim 3 wherein the carrier is a disc having its outer peripheral margin formed as a plurality of circumferentially spaced fingers, and the friction facing is adhered to said fingers.

5. An assembly as claimed in claim 4 and further comprising a second friction facing arranged coaxially with the first facing and adhered to the carrier to face in the opposite direction to the first facing.

6. An assembly as claimed in claim 5, wherein said second facing is secured to the carrier as aforesaid in claim 1 with reward to the first facing.

7. An assembly as claimed in claim 6 wherein the circular stripes of adhesive on one facing are in alignment with those on the other facing and unite with each other in the gaps between the fingers to which the facings are adhered.

8. A friction clutch driven plate including a friction material facing and carrier assembly as claimed in claim 1.

* * * * *